(12) United States Patent
Ramakrishnan et al.

(10) Patent No.: US 7,993,754 B2
(45) Date of Patent: Aug. 9, 2011

(54) ARCHITECTURAL UNIT POSSESSING RAPID DEEP-SECTION CURE SILICONE RUBBER COMPONENT

(75) Inventors: Indumathi Ramakrishnan, Bangalore (IN); Edward Joseph Nesakumar, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 696 days.

(21) Appl. No.: 11/728,899

(22) Filed: Mar. 27, 2007

(65) Prior Publication Data

US 2008/0242762 A1 Oct. 2, 2008

(51) Int. Cl.
 *B32B 9/04* (2006.01)
(52) U.S. Cl. ........ 428/448; 524/268; 524/320; 524/366; 524/375; 524/381; 524/430; 524/588; 528/17; 528/18; 528/34
(58) Field of Classification Search .................... 523/122
See application file for complete search history.

(56) References Cited

U.S. PATENT DOCUMENTS

| 4,559,319 | A | * | 12/1985 | Kurita et al. ................... 502/156 |
| 5,292,606 | A | | 3/1994 | Fitzgerald |
| 5,733,960 | A | | 3/1998 | Altes et al. |
| 5,786,414 | A | * | 7/1998 | Chikuni et al. ................. 524/413 |
| 6,258,878 | B1 | | 7/2001 | Bahadur et al. |
| 6,710,119 | B2 | * | 3/2004 | Kimura et al. ................. 524/588 |

FOREIGN PATENT DOCUMENTS

| EP | 0558044 | | 9/1993 |
| EP | 0799859 | | 10/1997 |
| EP | 799859 | A2 * | 10/1997 |
| EP | 1209201 | | 5/2002 |
| EP | 1209201 | A1 * | 5/2002 |
| EP | 1258508 | | 11/2002 |
| EP | 1258508 | A2 * | 11/2002 |

* cited by examiner

*Primary Examiner* — Marc S Zimmer
(74) *Attorney, Agent, or Firm* — Dominick G. Vicari

(57) ABSTRACT

The invention relates to architectural elements possessing at least two components bonded together employing a silicone rubber composition possessing rapid development of strength and deep-section cure, which is useful for application as a bedding sealant in the manufacture of such architectural elements as window assemblies, door assemblies, structural glazing, curtainwall applications, and the like.

24 Claims, 5 Drawing Sheets

ARCHITECTURAL UNIT POSSESSING RAPID DEEP-SECTION CURE SILICONE RUBBER COMPONENT

FIELD OF THE INVENTION

This invention is related to architectural elements possessing at least two components bonded together employing a silicone rubber composition possessing rapid development of strength and deep-section cure.

DESCRIPTION OF THE INVENTION

The skyscraper and "high-rise" building section of the construction industry is growing rapidly, especially in the developing economies. This industry uses sealants to hold various construction materials, e.g., glass windows and metal, together. By its nature this construction takes place at high elevations, as such, specific sealant properties are necessary for this market. These properties include ease of application and very fast development of strength with deep-section cure. Conventional sealants offer ease of application, e.g., one-part sealants. However, conventional silicone polymers systems typically develop strength and deep-section cure rather slowly, i.e., after a few days to a few weeks of exposure to a moist atmosphere.

Moreover, rapid development of strength and deep-section cure is often desired in certain sealant and/or adhesive applications, e.g., "high rise" construction, automotive, and insulating glass applications.

There remains a need within the art for silicone sealants possessing rapid development of strength and deep-section cure, i.e., a few hours to a few days.

SUMMARY OF THE INVENTION

Figure 1:
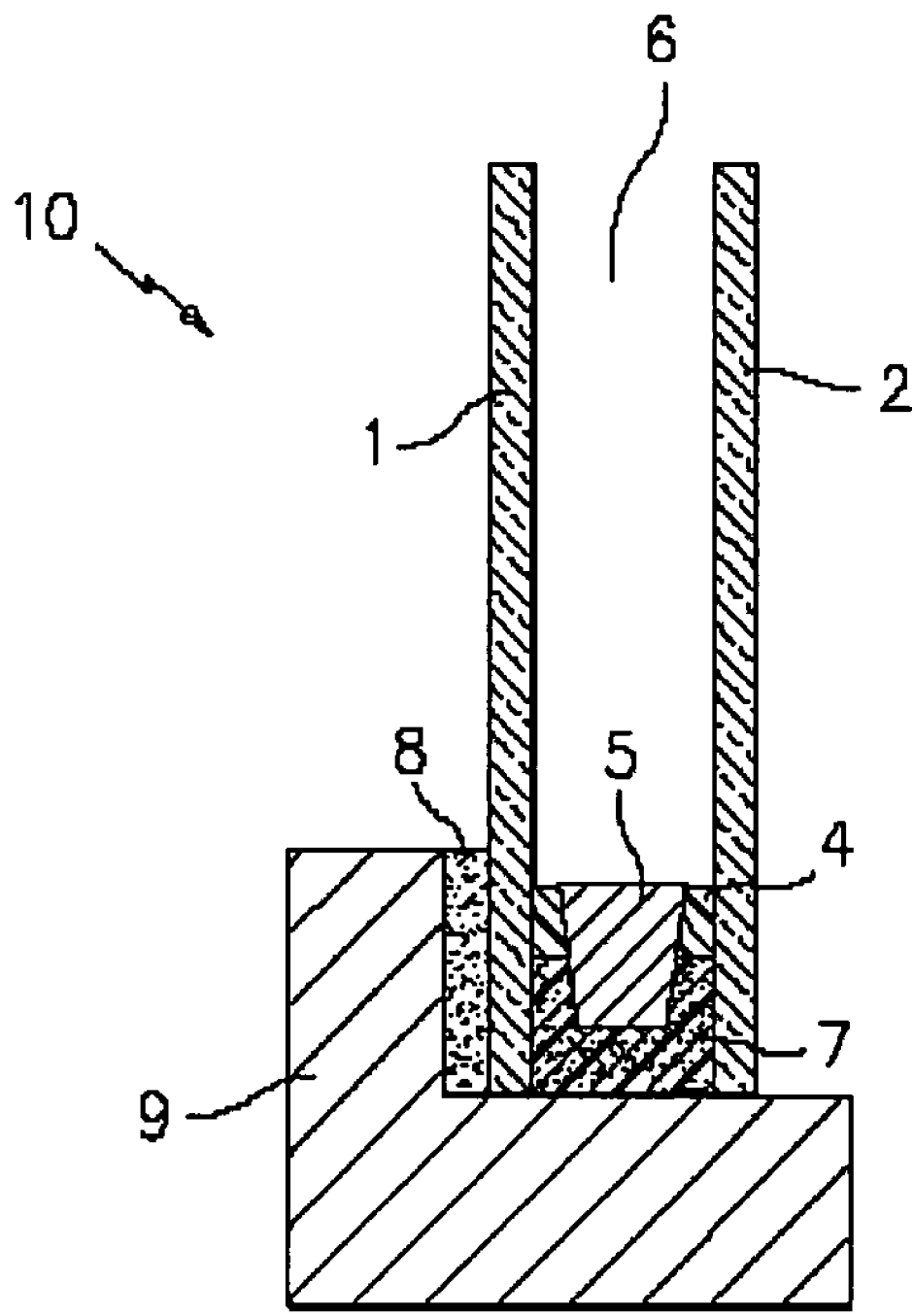
FIG. 1 is a sectional side view of an insulated glass unit (IGU) maintained in sealing relationship employing a rapid deep-section cure bedding glaze composition in accordance with the invention.
Figure 2:
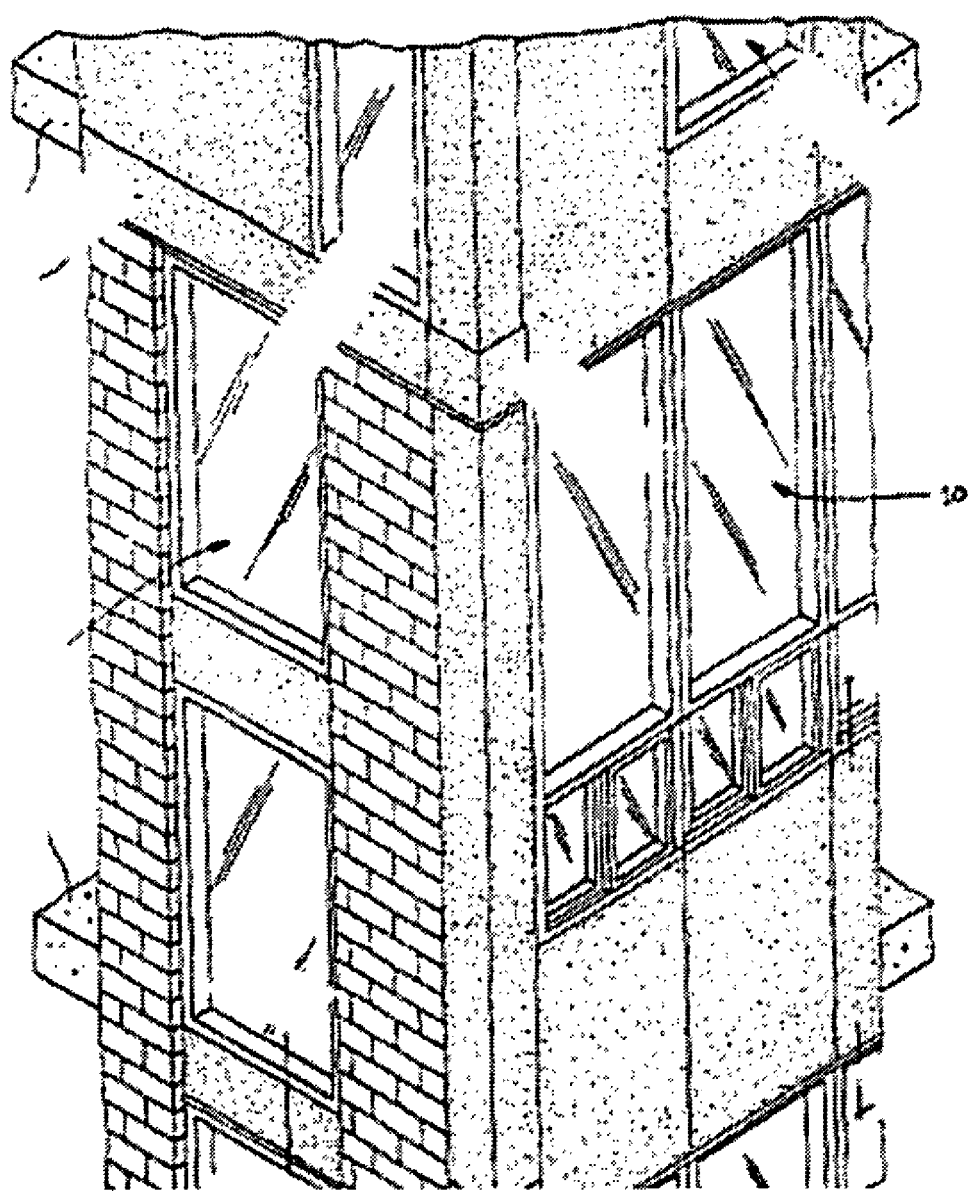
FIG. 2 is a perspective sectional view of the exterior of a "high-rise" building depicting a variety of installed window systems including the IGU of FIG. 1.

The present invention provides an architectural element possessing at least two components bonded together or otherwise maintained in sealing relationship to each other employing a silicone rubber composition obtained by the curing of a mixture which comprises:
a) at least one silanol-terminated diorganopolysiloxane;
b) at least one crosslinker for the silanol-terminated diorganopolysiloxane(s);
c) at least one catalyst for the crosslinking reaction;
d) a rapid deep-section curing amount zinc oxide; and, optionally,
e) at least one additional component selected from the group consisting of alkyl-terminated diorganopolysiloxane, filler, UV stabilizer, antioxidant, adhesion promoter, cure accelerator, thixotropic agent, plasticizer, moisture scavenger, pigment, dye, surfactant, solvent and biocide.

DETAILED DESCRIPTION OF THE INVENTION

As used herein the expression "architectural element" denotes a prefabricated or manufactured unit used in building construction, e.g., a window, in particular, an insulated glass unit ("IGU"), a glass-paneled door, doors containing one or more windows, prefabricated windows, sliding doors with one or more windows, folding doors with one or more windows, curtainwall, shop glazing, structural glazing, skylight, light fixtures, and the like, in which a bonding, bedding glaze, sealant, caulking or adhesive composition is used to bond the glazing to structural elements comprising the architectural element.

As used herein the term "glazing" has its ordinary meaning, a meaning that is inclusive of glass and glass substitutes such as polyacrylates, specifically polymethylmethacrylate and polycarbonates and the like including but not limited to the transparent, translucent and opaque varieties of glazing.

As used herein the expression "bedding glaze," and terms "adhesive," "bonding," "sealant," or "caulking" composition encompasses or comprises the silicone rubber-forming composition of the present invention.

As used herein structural elements are materials used for construction of, e.g., buildings, window frames and window frame assembly, etc., which are made of those materials known in the art, e.g. wood, stone, brick, steel, aluminum, brass, iron, copper, concrete, plastic, plastic covered wood or metal and the like.

The term "compatible" as used herein means the optional component does not negatively or adversely affect in a material way the storage stability of the part in which it is contained and when contained in such part, the intended functions of the optional component is not negatively or adversely affected in a material way.

As understood herein the curing of sealant compositions can be expressed as the "tack-free time" or surface curing and "deep-section cure" or curing along the sealant's thickness. Tack-free time is tested by spreading a sealant to the desired thickness (e.g., 6.35 mm) on a Teflon mold and placing a 10 g stainless steel (SS) weight on the sealant at different intervals of time. The tack free time is the time when no material sticks to the surface of the weight. Alternatively, "deep-section cure" or curing along the thickness is tested based on the spread material being cut along the thickness periodically to detect the complete curing. The time taken for the material to cure completely along the thickness is called deep section cure, also known as "thick-section cure." Apart from visual observation the inventors have devised a method to measure the deep-section cure, more fully described herein below, by extracting the uncured material of the sealant by solvent.

With reference to FIG. 1, insulated glass unit 10 includes glass sheets 1 and 2 maintained in spaced-apart relationship by a gas sealant assembly possessing a primary gas sealant member 4, continuous spacer member 5 and secondary sealant 7. Space 6 between sheets 1 and 2 is filled with an insulating gas or gases such as argon. A rapid deep-section cure bedding glaze composition 8 prepared as hereinafter described is placed between glass sheet 1 and window frame assembly 9. Panes 1 and 2 can be fabricated from any of a variety of materials such as glass, e.g., clear float glass, annealed glass, tempered glass, solar glass, tinted glass, e.g., low energy glass, etc., acrylic resin and polycarbonate resin, and the like.

The utilization of rapid deep-section cure bedding glaze composition 8 (i.e., the silicone rubber-forming composition of the present invention) in the foregoing insulated glass units provides for productivity gains in the manufacture of these units including improved adhesion build and rapid development of strength with deep-section cure. Other benefits include long storage life as well as improved application rates of the sealant in addition to providing the required performance attributes of typical bedding glaze sealants including adhesion, adhesive strength and elongation. As a result, the deep-section cure bedding glaze composition 8 can be used as a sealant and/or adhesive because it exhibits high bond strength including a good balance between shearing bond strength and peeling bond strength, and therefore, in particular, holds promise for application as a bedding glaze sealant in the production of various glass units, e.g., glass installation in high-rise buildings.

Primary sealant member 4 of the insulated glass unit 10 can be comprised of polymeric materials known in the art, for example, rubber base materials such as polyisobutylene, butyl rubber, polysulfide, EPDM rubber, nitrile rubber, and the like. Other useful materials include, polyisobutylene/polyisoprene copolymers, polyisobutylene polymers, brominated olefin polymers, copolymers of polyisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, styrene butadiene polymers, and the like.

As indicated above, primary gas sealant member 4 can be fabricated from a material such as polyisobutylene which has very good sealing properties. A desiccant can be included in continuous spacer 5 in order to remove moisture from the insulating gas occupied space between glass panes 1 and 2. Useful desiccants are those that do not adsorb the insulating gas/gases filling the interior of the insulated glass unit.

The deep-section cure bedding glaze composition 8 of the present invention is a stable room-temperature curable silicone sealant composition that provides rapid primeness bond strength and deep-section cure as hereinafter more fully described.

The deep-section cure bedding glaze composition 8 of the present invention is comprised of a room-temperature vulcanizing (RTV) silicone rubber-forming composition. A general description of each of the components of the deep-section cure bedding glaze composition are given as follows:

The silanol-terminated diorganopolysiloxane polymer (SDPS), component (a), of the deep-section cure bedding glaze composition 8 of the present invention is advantageously selected from amongst those of the general formula:

$$M_a D_b D'_c$$

with the subscript a=2 and b equal to or greater than 1 and with the subscript c zero or positive where $$M=(HO)_{3-x-y}R^1{}_x R^2{}_y SiO_{1/2};$$

with the subscript x=0, 1 or 2 and the subscript y is either 0 or 1, subject to the limitation that x+y is less than or equal to 2, where $R^1$ and $R^2$ are independently chosen monovalent hydrocarbon radicals up to about 60 carbon atoms; where $$D=R^3 R^4 SiO_{1/2};$$

where $R^3$ and $R^4$ are independently chosen monovalent hydrocarbon radicals of up to about 60 carbon atoms; where $$D'=R^5 R^6 SiO_{2/2};$$

where $R^5$ and $R^6$ are independently chosen monovalent hydrocarbon radicals of up to about 60 carbon atoms.

In one embodiment of the present invention, the level of incorporation of the diorganopolysiloxane wherein the silicon atom at each polymer chain end is silanol terminated ranges from about 5 weight percent to about 95 weight percent, and from about 20 weight percent to about 85 weight percent in another embodiment, and in yet another embodiment from about 30 weight percent to about 60 weight percent of the total composition.

Suitable cross-linkers, component (b), for use in the deep-section cure bedding glaze composition 8 of the present invention include an alkylsilicate of the general formula:

$$(R^7 O)(R^8 O)(R^9 O)(R^{10}O)Si$$

where $R^7$, $R^8$, $R^9$ and $R^{10}$ are independently chosen monovalent $C_1$ to $C_{60}$ hydrocarbon radicals.

Other suitable crosslinkers include, but are not limited to, tetra-N-propylsilicate (NPS), tetraethylortho silicate and methyltrimethoxysilane (MTMS), vinyltrimethoxysilane (VTMS) and similar alkyl substituted alkoxysilane compositions, and the like.

In one embodiment of the present invention, the level of incorporation of the alkylsilicate (crosslinker) ranges from about 0.1 weight percent to about 10 weight percent. In another embodiment of the invention, the level of incorporation of the alkylsilicate (crosslinker) ranges from about 0.3 weight percent to about 5 weight percent. In yet another embodiment of the present invention, the level of incorporation of the alkylsilicate (crosslinker) ranges from about 0.5 weight percent to about 1.5 weight percent of the total composition.

Suitable catalysts, component (c), for use in the deep-section cure bedding glaze composition 8 of the present invention can be any of those known to be useful for facilitating crosslinking in silicone sealant compositions. The catalyst may include metal and non-metal catalysts. Examples of the metal portion of the metal condensation catalysts useful in the present invention include tin, titanium, zirconium, lead, iron cobalt, antimony, manganese, bismuth and zinc compounds.

According to one embodiment of the present invention, tin compounds useful for facilitating crosslinking in silicone sealant compositions include: tin compounds such as dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, sylilated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, and the like.

In one embodiment of the invention, the catalyst is a metal catalyst. In another embodiment of the invention, the metal catalyst is selected from the group consisting of tin compounds, and in yet another embodiment of the invention, the metal catalyst is solubilized dibutyl tin oxide.

According to another embodiment of the present invention, titanium compounds useful for facilitating crosslinking in silicone sealant compositions include: Di(isopropoxide)Titanium bis(ethylacetoacetate) [Dupont; Tyzor DC]; Di(isobutoxide)Titanium bis(ethylacetoacetato) [Johnson Matthey; Vertec KE6]; Di(n-butoxide)Titanium bis(ethylacetoacetato) [Johnson Matthey]; 1,3-propanedioxytitanium bis(ethylacetoacetate); Titanium(triethanolaminato)isopropoxide [Dupont; Tyzor TE]; Bis(triethanolamino)titanium di(methyl diglycolate) [Sanmar; Isocat ETAM]; Titanium diisopropoxide(bis-2,4-pentanedionate) [Dupont; Tyzor AA]; Titanium ethoxide isopropoxide bis-(2,4-pentanedionate) [Sanmar; Isocat AA 65]; Titanium bis-(2,4-pentanedionate) (2-EHA) [Johnson Matthey; Vertec XL100]; and tetra-alkyl titanates, for example, tetra n-butyl titanate and tetra-isopropyl titanate, and the like.

According to one specific embodiment of the invention, the catalyst for the crosslinking reaction is Di(isopropoxide)Titanium bis(ethylacetoacetate).

In one embodiment of the invention, the level of incorporation of the catalyst ranges from about 0.001 weight percent to about 1 weight percent of the total composition. In another embodiment off the invention, the level of incorporation of the catalyst, ranges from about 0.003 weight percent to about 0.5 weight percent of the total composition. In yet another embodiment of the invention, the level of incorporation of the catalyst, ranges from about 0.005 weight percent to about 0.2 weight percent of the total composition.

The deep-section cure bedding glaze composition 8 of the present invention provides room-temperature curable silicone sealant composition, which cures to provide rapid deep-section cure. This rapid deep-section cure is provided by the presence of particulate zinc oxide (d) in the room temperature-curable silicone sealant composition when present in an amount of at least about 1 parts by weight per 100 parts by weight of the total composition of the room-temperature curable silicone sealant composition. In one specific embodiment of the invention, the zinc oxide is present in amounts from about 2 to about 30 parts by weight per 100 parts by weight of the total composition, and in a more specific embodiment from about 5 to about 20 parts by weight per 100 parts by weight of the total composition.

The particulate zinc oxide (d) of the present invention possesses an average particle size of less than about 1 micron, from about 50 to about 70 nm, and a surface area from about 5 to about 30 m$^2$/g. The zinc oxide (d) possesses a purity of from about 80 to about 99.9 percent and a pH that ranges from about 7.0 to about 9.0. The zinc oxide of the present invention is commercially available as White Seal (EP 100) (available from MLA group of Industries, Kanpur, India); Zincosil NK-T-150 (available from MLA group of Industries, Kanpur, India); Zincosil AH-90 (available from MLA group of Industries, Kanpur, India); ACS (available from Aldrich Chemical Co.); Zinc oxide nano powder (available from Aldrich Chemical Co.).

According to one embodiment of the invention, the deep-section cure bedding glaze composition 8 is obtained as a "one-part" composition, wherein all the ingredients are contained in one package and curing occurs upon exposure to atmospheric air.

According to another embodiment of the invention, the deep-section cure bedding glaze composition 8 is obtained using a "two-part" composition, such compositions are well known in the art. In a two-part system the first part comprises polydiorganosiloxane as described herein, and zinc oxide, and a second part comprises a crosslinker, such as the one described herein above. The second part can also contain filler and a curing catalyst for the room-temperature curable silicone composition. The particulate zinc oxide can be added to either the first or second part. The "parts" of these two-part compositions are stored in separate packages to prevent premature curing which can occur if all the ingredients are mixed for too long a time period before the use of the composition.

According to one embodiment of the invention, the deep-section cure bedding glaze composition 8 of the present invention further comprise an alkoxysilane or blend of alkoxysilanes as an adhesion promoter. In one embodiment, the adhesion promoter may be a combination blend of n-2-aminoethyl-3-aminopropyltrimethoxysilane and 1,3,5-tris(trimethoxysilylpropyl)isocyanurate. Other adhesion promoters useful in the present invention include but are not limited to n-2-aminoethyl-3-aminopropyltriethoxysilane, γ-aminopropyltriethoxysilane, γ-aminopropyltrimethoxysilane, aminopropyltrimethoxysilane, bis-γ-trimethoxysilylpropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3-dimethylbutyltrimethoxysilane, and n-ethyl-3-trimethoxysilyl-2-methylpropanamine, and the like.

The level of incorporation of the alkoxysilane (adhesion promoter) ranges from about 0.1 weight percent to about 20 weight percent. In one embodiment of the invention, the adhesion promoter ranges from about 0.3 weight percent to about 10 weight percent of the total composition. In another embodiment of the invention, the adhesion promoter ranges from about 0.5 weight percent to about 2 weight percent of the total composition.

In one embodiment, the deep-section cure bedding glaze composition 8 of the present invention includes a plasticizer to reduce the modulus of the cured elastomer. The plasticizer can be polydimethylsiloxane having terminal triorganosiloxy units where the organo groups are methyl, vinyl or phenyl or combinations of these groups. For example, the polydimethylsiloxanes used as plasticizers or modulus reducing agents can normally have a viscosity of from 100 to 100,000 mpa·s measured at 25° C. and can be used in amounts up to 80 parts by weight per 100 parts by weight of the polymeric material.

The deep-section cure bedding glaze composition 8 of the present invention may also comprise a filler. Suitable fillers of the present invention include, but are not limited to, ground, precipitated and colloidal calcium carbonates which is treated with compounds such as stearate or stearic acid, reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite or clays such as kaolin, bentonite or montmorillonite, talc, mica, and the like.

In one embodiment of the present invention, the filler is a calcium carbonate filler, silica filler or a mixture thereof. In another specific embodiment of the invention, the zinc oxide (d) is added directly to the filler. The type and amount of filler added depends upon the desired physical properties for the cured silicone composition. In another embodiment of the invention, the amount of filler is from 0 weight percent to about 90 weight percent of the total composition. In yet another embodiment of the invention, the amount of filler is from about 5 weight percent to about 60 weight percent of the total composition. In still another embodiment of the invention, the amount of filler is from about 10 weight percent to about 40 weight percent of the total composition. The filler may be a single species or a mixture of two or more species.

The deep-section cure bedding glaze composition 8 of the present invention may optionally comprise non-ionic surfactant compound selected from the group of surfactants consisting of polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof in an amount ranging from slightly above 0 weight percent to about 10 weight percent, more preferably from about 0.1 weight percent to about 5 weight percent, and most preferably from about 0.5 weight percent to about 0.75 weight percent of the total composition.

The deep-section cure bedding glaze composition 8 of the present invention may be prepared using other ingredients that are conventionally employed in room temperature vulcanizing (RTV) silicone compositions such as colorants and pigments as long as they do not interfere with the desired properties.

The following non-limiting examples illustrate the deep-section cure bedding glaze composition 8 of the invention:

Preparation of Comparative Example 1 and 2 sealant formulations:

TABLE 1

| Materials | Amount in grams (g) |
|---|---|
| Silanol (30000 cst) | 34 |
| OMYACARB FT - CaCO$_3$ | 50 |
| ZnO | 0 |
| Double treated fumed silica | 6 |
| Dimethylpolysiloxane Plasticizer | 10 |

Comparative Examples 1 and 2 were prepared without zinc oxide and consisted of the various ingredients displayed in Table 1. Comparative Example 1 and 2 were prepared the same way in Ross mixer using the following procedure: 34 g of silanol polymer was placed in the Ross mixer and 10 g of plasticizer was placed in a Ross kettle. Heat was applied to 100° C. 20 g of Omya CaCO$_3$ was slowly added while mixing. 2 g of doubly treated fumed silica was also added. Mixing continued for 15 minutes. The dispersion was checked. Additional 15 g of Omya CaCO$_3$ was slowly added along with 2 g of doubly treated fumed silica and mixed for 30 minutes. The dispersion was again checked. Another 15 g of Omya CaCO$_3$ slowly added to the mix, along with 2 more grams of doubly treated fumed silica and mixing continued for 2 hours. The mixture was transferred to an air-tight container.

Curing Procedure: The mixtures were then blended with catalyst, cross-linker and adhesion promoter with quantities and ingredients displayed in Table 2 and Table 3, respectively, and placed in a Hauschild speed mixer and kept for 9-14 days for aging. The mixtures of Comparative Examples 1 and 2 were then removed and poured in Teflon molds with ¼" depth.

Comparative Example 1 was prepared with cross-linker methyl trimethoxy silane (MTMS) and adhesion promoter tris(trimethoxy silyl propyl)isocyanurate (Iso-T) as displayed in Table 2:

TABLE 2

| Comp. Ex. 1 | Silanol + CaCO3 + Plasticizer + Fumed silica | 48.5 g |
|---|---|---|
| Catalyst | Titanium isopropoxide ethylacetylacetonate | 0.5 g |
| Cross-linker | MTMS | 0.9 g |
| Adhesion promoter | Iso-T | 0.2 g |

Comparative Example 2 was prepared exactly as Comparative Example 1 except that cross-linker vinyl trimethoxy silane (VTMS) and adhesion promoter Iso-T were used as displayed in Table 3:

TABLE 3

| Comp. Ex. 2 | Silanol + CaCO3 + Plasticizer + Fumed silica | 48.5 g |
|---|---|---|
| Catalyst | Titanium isopropoxide ethylacetylacetonate | 0.5 g |
| Cross-linker | VTMS | 0.9 g |
| Adhesion promoter | Iso-T | 0.2 g |

Preparation of Example 1 sealant formulation:

TABLE 4

| Materials | Amount in grams (g) |
|---|---|
| Silanol (30000 cst) | 33 |
| OMYACARB FT - CaCO$_3$ | 45 |
| ZnO | 5 |
| Double treated fumed silica | 6 |
| Dimethylpolysiloxane Plasticizer | 10 |

Example 1 sealant formulation was prepared with zinc oxide and the various ingredients displayed in Table 4. Example 1 was prepared in Ross mixer using the following procedure: 34 g of silanol polymer was placed in a Ross mixer and 10 g of plasticizer in a Ross kettle. Heat was applied to 100° C. 15 g of Omya CaCO$_3$, 2 g of doubly treated fumed silica, and 5 g of zinc oxide were slowly added while mixing. Mixing continued for 15 minutes. The dispersion was checked. An additional 15 g of Omya CaCO$_3$ and 2 g of doubly treated fumed silica were slowly added to the mixture. Mixing proceeded for 30 minutes. The dispersion was checked. Another 15 g of Omya CaCO$_3$ and 2 g of doubly treated fumed silica were slowly added to the mixture. Mixing continued for 2 hours. The mixture was transferred in an air tight container.

Curing Procedure: The mixture was then blended with catalyst, cross-linker and adhesion promoter with quantities and ingredients displayed in Table 5, in a Hauschild speed mixer and kept for 9-14 days for aging. The mixture was then taken out and poured in a Teflon mold with ¼" depth.

Example 1 was prepared cross-linker MTMS and adhesion promoter Iso-T:

TABLE 5

| Example 1 | Silanol + CaCO3 + Plasticizer + Fumed silica | 48.5 g |
|---|---|---|
| Catalyst | Titanium isopropoxide ethylacetylacetonate | 0.5 g |
| Cross-linker | MTMS | 0.9 g |
| Adhesion promoter | Iso-T | 0.2 g |

The ingredients of Example 2 sealant formulation are displayed in Table 6:

TABLE 6

| Materials | Amount in grams (g) |
|---|---|
| Silanol (30000 cst) | 34 |
| OMYACARB FT - CaCO$_3$ | 40 |
| ZnO | 10 |
| Double treated fumed silica | 6 |
| Dimethylpolysiloxane Plasticizer | 10 |

Example 2 sealant formulation was prepared with zinc oxide and the various ingredients displayed in Table 6. Example 2 was prepared in Ross mixer using the following procedure: 34 g of Silanol polymer was placed in a Ross mixer and 10 g of plasticizer was placed in a Ross kettle. Heat was applied to 100° C. 15 g of Omya CaCO₃, 2 g of doubly treated fumed silica, and 10 g of zinc oxide were slowly added while mixing. Mixing continued for 15 minutes. The dispersion was checked. An additional 10 g of Omya CaCO₃ and 2 g of doubly treated fumed silica were slowly added to the mixture. Mixing proceeded for 30 minutes. The dispersion was checked. Another 15 g of Omya CaCO₃ and 2 g of doubly treated fumed silica were slowly added to the mixture. Mixing continued for 2 hours. The mixture was transferred in an air tight container.

Curing Procedure: The mixture was then blended with catalyst, cross-linker and adhesion promoter with quantities and ingredients displayed in Table 7, in a Hauschild speed mixer and kept for 9-14 days for aging. The mixture was then taken out and poured in a Teflon mold with ¼" depth.

Example 2 was prepared with cross-linker VTMS and adhesion promoter Iso-T and the various ingredients of Table 7:

TABLE 7

| Example 2 | Silanol + CaCO3 + Plasticizer + Fumed silica | 48.5 g |
| Catalyst | Titanium isopropoxide ethylacetylacetonate | 0.5 g |
| Cross-linker | VTMS | 0.9 g |
| Adhesion promoter | Iso-T | 0.2 g |

Figure 3:
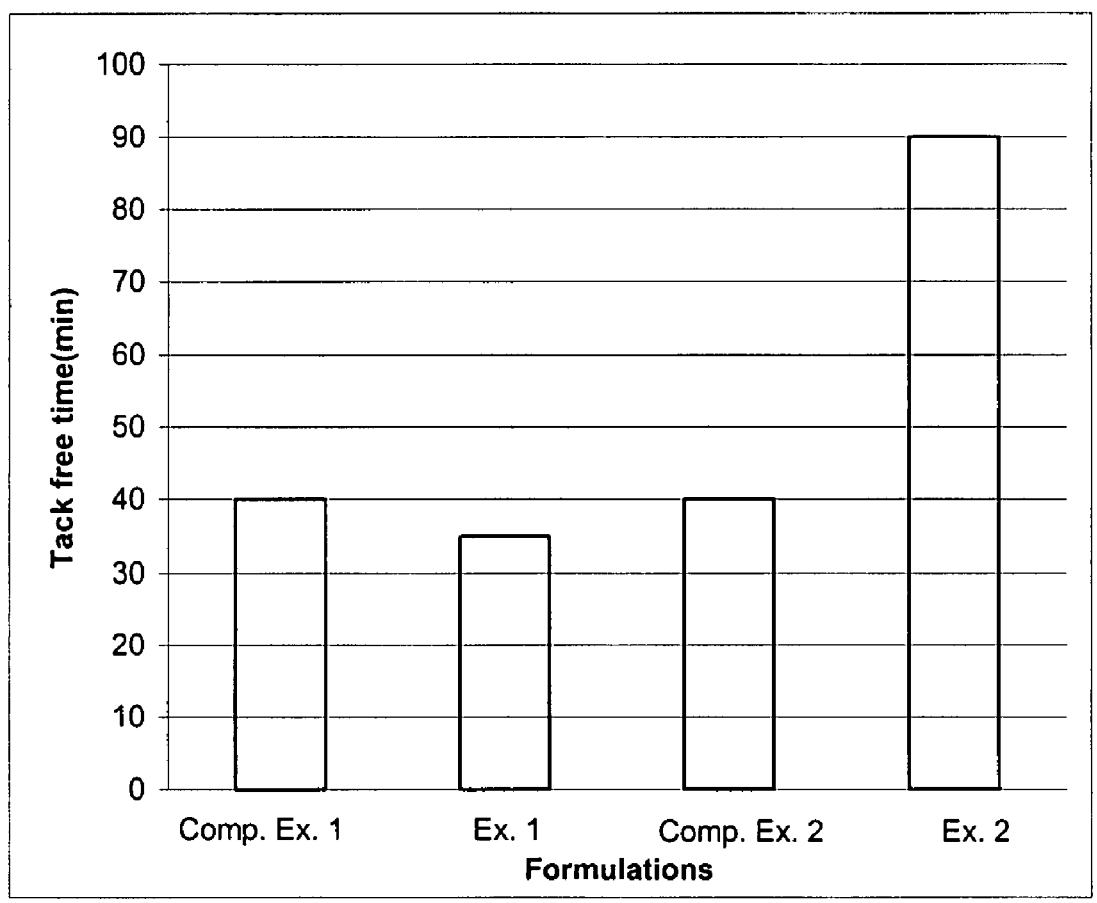
FIG. 3 is a graphical representation of the "tack-free time" of Comparative Examples 1 and 2 and Examples 1 and 2.

Tack Free Time and Deep Section Cure measurements: After applying Examples 1-2 and Comparative Examples 1-2 in Teflon molds with ¼" thickness, the surface was made even with an aluminum spacer. Beginning at the time the material was first applied, the surface was checked with a 10 g weight to determine if the material is tack free at 15 minute intervals (minimum) until it is found to be tack-free. Tack free time data of Examples 1-2 and Comparative Examples 1-2 are presented in FIG. 3.

Deep-section cure was determined by solvent swelling experiments as follows: A weighed portion of the resin in accordance with Examples 1-2 and Comparative Examples 1-2 was obtained from a cut along the thickness of the mold (a sample of about 5 grams from each of Examples 1-2 and Comparative Examples 1-2 was obtained) and allowed to swell in 100 ml of toluene for 3 days. The samples from Example 1-2 and Comparative Examples 1-2 were removed from the toluene and kept for drying under ambient conditions for 3 days. Each sample was weighed again after drying. The difference in weight provides the amount of uncured sample from Example 1-2 and Comparative Examples 1-2 dissolved in toluene. This measurement was obtained at the $6^{th}$, $24^{th}$ and $48^{th}$ hour after applying the sealant examples in the Teflon mold. The percentage of uncured example was plotted against time.

Figure 4:
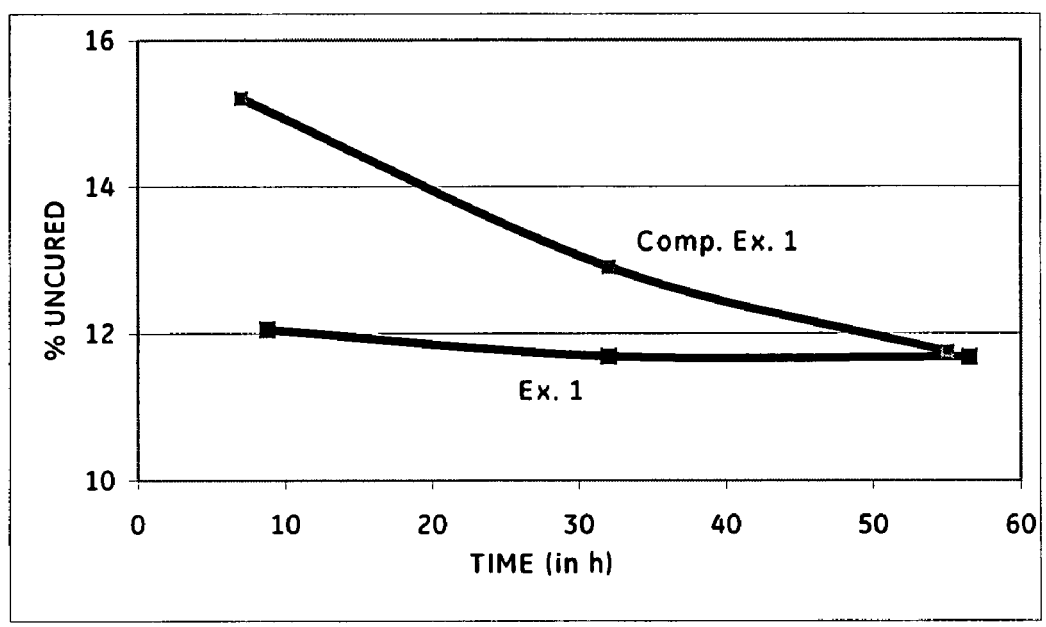
FIG. 4 is a graphical representation of the "deep-section cure" rates of Example 1 and Comparative Example 1.
Figure 5:
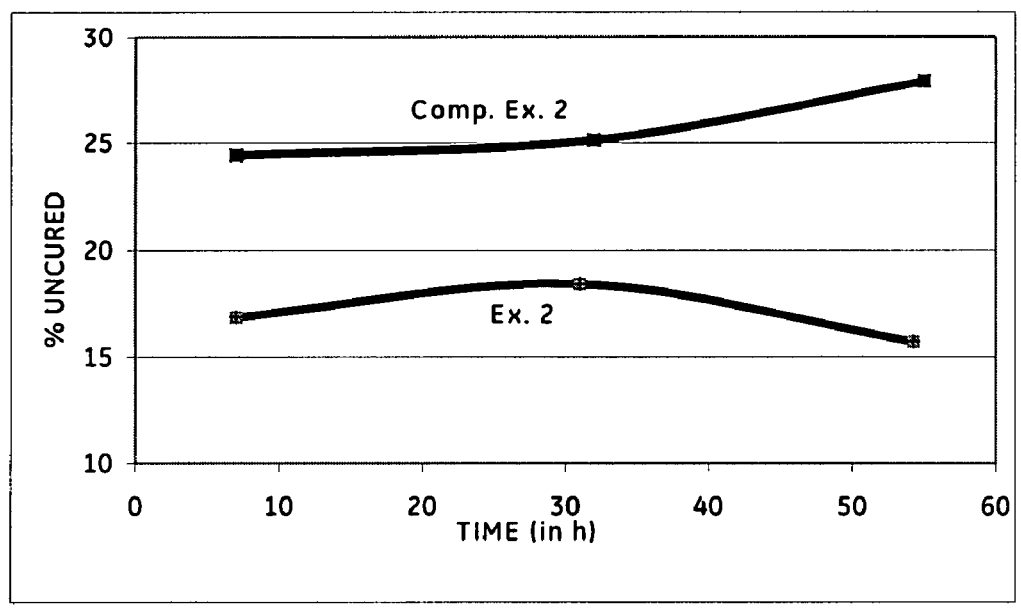
FIG. 5 is a graphical representation of the "deep-section cure" rates of Example 2 and Comparative Example 2.

Deep-section cure data for Comparative Example 1 and Example 1 are presented in FIG. 4, and deep-section cure data for Comparative Example 2 and Example 2 are presented in FIG. 5.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. An architectural element possessing at least two components bonded together or otherwise maintained in sealing relationship to each other employing a silicone rubber composition obtained by the curing of a mixture which comprises:
   a) at least one silanol-terminated diorganopolysiloxane;
   b) at least one crosslinker for the silanol-terminated diorganopolysiloxane(s);
   c) at least one catalyst for the crosslinking reaction in an amount of from 0.005 weight percent to 0.2 weight percent of the total composition;
   d) a rapid deep-section curing amount of zinc oxide; and,
   e) at least one non-ionic surfactant selected from the group consisting of polyethylene glycol, polypropylene glycol, ethoxylated castor oil, oleic acid ethoxylate, alkylphenol ethoxylates, copolymers of ethylene oxide and propylene oxide, copolymers of silicones and polyethers, copolymers of silicones, copolymers of ethylene oxide and propylene oxide and mixtures thereof in an amount ranging from about 0.1 weight percent to about 10 weight percent.

2. The architectural element of claim 1 wherein the diorganopolysiloxane polymer, component (a), is a silanol terminated diorganopolysiloxane having the formula:

$$M_a D_b D'_c$$

wherein a=2, b is equal to or greater than 1, c is zero or a positive integer;

$$M=(HO)_{3-x-y}R^1_x R^2_y SiO_{1/2};$$

wherein x=0, 1 or 2 and y is either 0 or 1, with the proviso that x+y is less than or equal to 2, $R^1$ and $R^2$ are monovalent $C_1$ to $C_{60}$ hydrocarbon radicals;

$$D=R^3 R^4 SiO_{2/2};$$

wherein $R^3$ and $R^4$ are monovalent $C_1$ to $C_{60}$ hydrocarbon radicals; and $$D'=R^5 R^6 SiO_{2/2};$$

wherein $R^5$ and $R^6$ are independently chosen monovalent $C_1$ to $C_{60}$ hydrocarbon radicals.

3. The architectural element of claim 1 wherein the crosslinker, component (b), possesses the general formula:

$$(R^7 O)(R^8 O)(R^9 O)(R^{10} O)Si$$

where $R^7$, $R^8$, $R^9$ and $R^{10}$ are independently chosen monovalent $C_1$ to $C_{60}$ hydrocarbon radicals.

4. The architectural element of claim 1 wherein the crosslinker, component (b), is at least one selected from the group consisting of tetra-N-propylsilicate, tetraethylortho silicate, and methyltrimethoxysilane.

5. The architectural element of claim 1 wherein the catalyst, component (c), is a tin catalyst.

6. The architectural element of claim 5 wherein the tin catalyst is at least one selected from the group consisting of dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexyloate, tinbutyrate, and diorganotin bis β-diketonate.

7. The architectural element of claim 1 wherein the catalyst, component (c), is a titanium compound.

8. The architectural element of claim 7 wherein the titanium compound is at least one selected from the group consisting of Di(isopropoxide)Titanium bis(ethylacetoacetate), Di(isobutoxide)Titanium bis(ethylacetoacetato), Di(n-butoxide)Titanium bis(ethylacetoacetato), 1,3-propanedioxytitanium bis(ethylacetoacetate), Titanium(triethanolaminato) isopropoxide, Bis(triethanolamino)titanium di(methyl diglycolate), Titanium diisopropoxide(bis-2,4-pentanedionate), Titanium ethoxide isopropoxide bis-(2,4-pentanedionate), Titanium bis-(2,4-pentanedionate) (2-EHA), tetra n-butyl titanate, and tetra-isopropyl titanate.

9. The architectural element of claim 8 wherein the titanium compound is Di(isopropoxide)Titanium bis(ethylacetoacetate).

10. The architectural element of claim 1 including an adhesion promoter selected from the group consisting of n-2-aminoethyl-3-aminopropyltrimethoxysilane, 1,3,5-tris(trimethoxysilylpropyl)isocyanurate, γ-aminopropyltriethoxysilane, γ-aminopropyltrimethoxysilane, aminopropyltrimethoxysilane, bis-γ-trimethoxysilylpropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3-dimethylbutyltrimethoxysilane, n-ethyl-3-trimethoxysilyl-2-methylpropanamine, and mixtures thereof.

11. The architectural element of claim 1 including a filler selected from the group consisting of clays, nano-clays, organo-clays, ground calcium carbonate, precipitated calcium carbonate, colloidal calcium carbonate, calcium carbonate treated with compounds stearate or stearic acid; fumed silica, precipitated silica, silica gels, hydrophobized silicas, hydrophilic silica gels, crushed quartz, ground quartz, alumina, aluminum hydroxide, titanium hydroxide, clay, kaolin, bentonite montmorillonite, diatomaceous earth, iron oxide, carbon black and graphite, talc, mica, and mixtures thereof.

12. The architectural element of claim 1 wherein the diorganopolysiloxane polymer, component (a), ranges from in amount from about 5 weight percent to about 95 weight percent of the total composition.

13. The architectural element of claim 1 wherein the diorganopolysiloxane polymer, component (a), ranges from in amount from about 20 weight percent to about 85 weight percent of the total composition.

14. The architectural element of claim 1 wherein the diorganopolysiloxane polymer, component (a), ranges from in amount from about 30 weight percent to about 60 weight percent of the total composition.

15. The architectural element of claim 1 wherein the amount of the cross-linker, component (b), ranges in amount from about 0.1 weight percent to about 10 weight percent of the total composition.

16. The architectural element of claim 1 wherein the amount of the cross-linker, component (b), ranges in amount from about 0.3 weight percent to about 5 weight percent of the total composition.

17. The architectural element of claim 1 wherein the amount of the cross-linker, component (b), ranges in amount from about 0.5 weight percent to about 1.5 weight percent of the total composition.

18. The architectural element of claim 1 wherein the amount of zinc oxide, component (d), ranges in amount from about 1 to about 60 weight percent of the total composition.

19. The architectural element of claim 1 wherein the amount of zinc oxide, component (d), ranges in amount from about 2 to about 30 weight percent of the total composition.

20. The architectural element of claim 1 wherein the amount of zinc oxide, component (d), ranges in amount from about 5 to about 20 weight percent of the total composition.

21. The architectural element of claim 11 wherein the amount of filler, ranges in amount from 0 to about 90 weight percent of the total composition.

22. The architectural element of claim 10 wherein the amount of adhesion promoter ranges in amount from about 0.5 weight percent to about 20 weight percent of the total composition.

23. The architectural element of claim 1 wherein the silicone rubber composition further includes an additional component selected from the group consisting of alkyl-terminated diorganopolysiloxane, filler, UV stabilizer, antioxidant, adhesion promoter, cure accelerator, thixotropic agent, plasticizer, moisture scavenger, pigment, dye, solvent and biocide.

24. An architectural element possessing at least two components bonded together or otherwise maintained in sealing relationship to each other employing a silicone rubber composition obtained by the curing of a mixture which comprises:
   a) at least one silanol-terminated diorganopolysiloxane;
   b) at least one crosslinker for the silanol-terminated diorganopolysiloxane(s);
   c) at least one catalyst for the crosslinking reaction in an amount of from 0.005 weight percent to 0.2 weight percent of the total composition;
   d) a rapid deep-section curing amount of zinc oxide having an average particle size of from 50 to 70 nanometers; and,
   e) at least one non-ionic surfactant.

* * * * *